Jan. 24, 1939.    H. LEDWINKA    2,145,183
FINAL DRIVE GEAR FOR VEHICLES WITH SWINGING HALF-AXLES
Filed Nov. 28, 1936    2 Sheets—Sheet 1

Inventor
Hans Ledwinka
By B. Singer, atty.

Jan. 24, 1939. H. LEDWINKA 2,145,183
FINAL DRIVE GEAR FOR VEHICLES WITH SWINGING HALF-AXLES
Filed Nov. 28, 1936   2 Sheets-Sheet 2

Inventor
Hans Ledwinka
By B. Singer, atty.

Patented Jan. 24, 1939

2,145,183

UNITED STATES PATENT OFFICE 2,145,183

FINAL DRIVE GEAR FOR VEHICLES WITH SWINGING HALF-AXLES

Hans Ledwinka, Morava, Czechoslovakia

Application November 28, 1936, Serial No. 113,228
In Czechoslovakia November 30, 1935

3 Claims. (Cl. 180—73)

In the case of vehicles with swinging half axles, the fitting of the drive in housings and particularly the sealing thereof presents considerable difficulties. With all known constructions, there are either openings which must be covered by leather caps or the like or cylinders or globular shells, or they show uncovered driving parts. The covering by means of leather caps or the like is very incomplete, since such parts easily tear, and the lubricant then escapes from the housings and on the other hand sand, dust and other impurities penetrate, resulting in a short time in the destruction of the axle gear in question. The provision of spherical or cylindrical sealing surfaces has the defect that sand and dust become deposited on the co-operating surfaces, of which one is always more or less exposed, whereby combined with the lubricant on the surface these surfaces are destroyed, the sealing effect being again prejudicially affected.

Further particulars with regard to the disadvantages of exposed driving members are unnecessary.

The disadvantages of the known constructions are obviated according to the present invention by a combination of features each already partly known. The invention resides in the drive, enclosed by a casing, the drive being composed of a crown wheel fixed on the half axle shaft, a bevel wheel engaging the crown wheel and being mounted on an axle running in the direction of travel and a gear wheel mounted on said axle of the bevel wheel and which engages with a corresponding gear wheel on another shaft also running in the longitudinal direction and driven directly or indirectly by the engine, the half axle swinging about the axis of said latter shaft.

Further details and features of the invention will be described with reference to the constructions shown in the accompanying drawings and described below.

Figure 1:
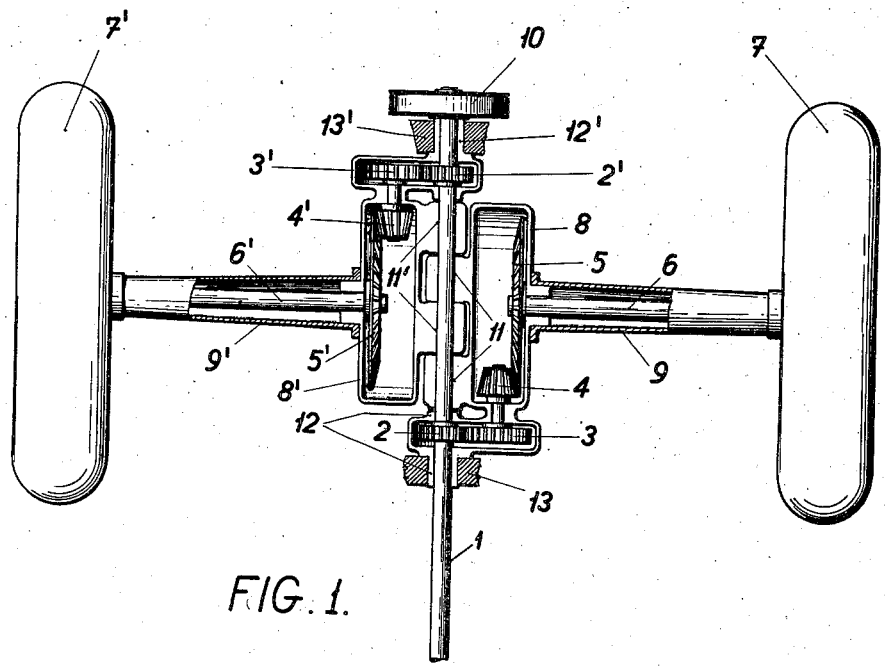
Figure 1 shows diagrammatically in plan a pair of wheels with half axles and drive, partly in section.

In Figure 1, spur wheels 2 and 2' are fixed on a main driving shaft 1. The wheels 2, 2' engage spur wheels 3, and 3'. They are connected with the wheels 3, 3' bevel wheels 4 or 4' which engage crown wheels 5 or 5'. The crown wheels 5, 5' are fixed on the inner ends of half axle shafts 6 or 6', the outer ends of which are connected with the driven running wheels 7 or 7'. Each of the drives consisting of the spur-wheels 2, 3, 4, and 5, or respectively 2', 3', 4', 5', is enclosed by a housing 8 or 8', which if necessary is connected with the inner end of the axle tube 9 or 9' and forms the inner section of the corresponding half axles. A brake device 10 can be mounted on the end of the shaft 1.

The casings or housings 8, 8' are oscillatable about the shaft 1 by means of the bearing parts 11, 12 or 11', 12'. The bearing parts 12, 12' are embraced externally by bearings 13 or 13' on the fixed vehicle chassis or centre bearer, whilst in their interior is arranged the shaft 1. In this manner the result is attained that the spur-wheels 2, 3 are carried in the same housing and thus the engagement of the spur-wheels is not affected by the adjustment or wear of the bearings serving for the guiding of the half axles.

In general the bearing parts or projections 11 will not directly embrace the driving shaft but the driving shaft will be mounted in the interior of a part mounted on the chassis frame or carrier on the outside of which are then provided the bearing surfaces for the bearing projections 11. The end of a half axle opposite to the gearing can also have a bearing projection which embraces the gearing of the other half axle.

As seen from Figure 1 the gearings for the corresponding half axles are arranged on different sides of the vertical transverse plane determined by the half axles. In this way the mounting of the drive is facilitated and furthermore entirely identical drives, casings and half axles can be used whereby the manufacture, maintenance and renewal of the bearings is considerably simplified.

Figures 2, 3:
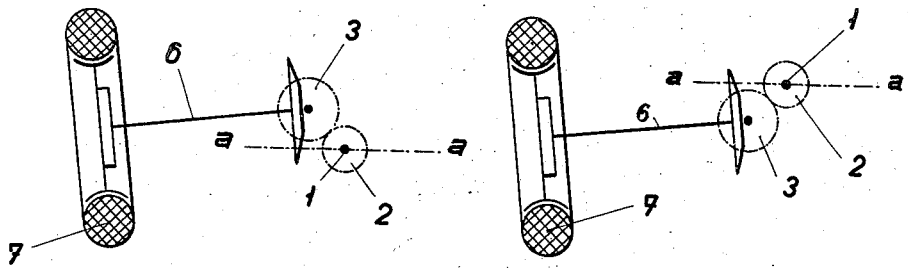
Figures 2 and 3 show diagrammatically in end elevation two different arrangements of the driving wheels.

As shown by Figures 2 and 3 the gear wheels, 3, 3' need not be arranged in the same horizontal plane a, a as the shaft 1, it being advantageous for attaining as small a distance as possible of the shafts from each other in plan, to arrange the main shaft 1 and the gear shafts over or under each other.

In addition to the advantages already mentioned, the improved construction also presents the advantage that for the separately enclosed half axle drives only a single main drive shaft need be used. A further advantage arises from the fact that by interchange of the wheels 2, 3 and 2', 3' the transmission ratio can be easily and cheaply altered. Such a variation of the transmission ratio is, with crown wheels arranged on the main longitudinal shaft and engaging the crown wheels, only carried out with difficulty and furthermore spur-wheels are cheaper than bevel wheels.

Also, the mounting, removal and exchange of the half axles is considerably simplified and there is a greater constructive freedom with respect to the choice of the frame or centre bearer; the improved driving arrangement is adapted not only for chassis with a single tube, I-, U- or box centre bearer or girder but also for ordinary chassis frames.

The construction according to the invention can naturally be used for as many driving wheels as required on one and the same vehicle.

Figure 4:
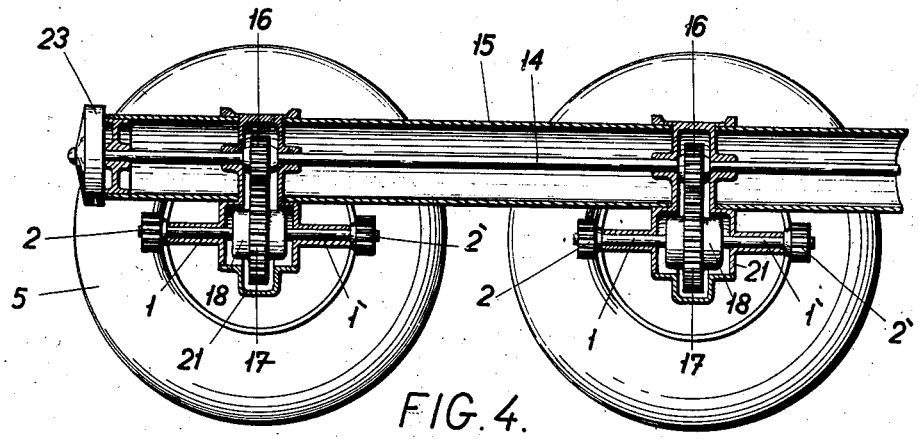
Figure 4 shows in longitudinal section a further construction applied to a vehicle having two pairs of driven rear wheels.
Figures 5, 6:
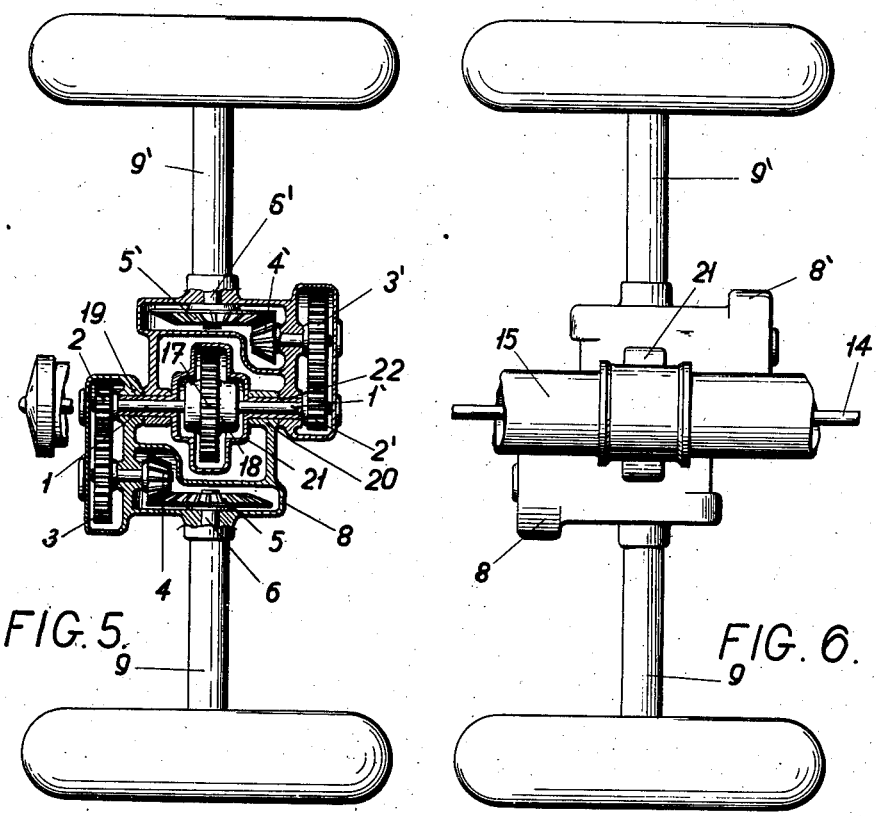
Fig. 5 is a plan view, parts being broken away and parts being shown in horizontal section.
Figure 6 shows a plan view of one of the pairs of half axles and final drive casing of Figure 4.

In the construction shown in Figures 4, 5, and 6 a main driving shaft 14 is mounted within a central longitudinal tubular chassis member 15. Fixed to the shaft 14 are the spur wheels 16 which mesh with the spur wheels 17. Each of these wheels 17 drives, by means of a differential gear 18, short intermediate shafts 1 and 1', the ends of which carry the spur wheels 2 and 2'.

As in the construction shown in Figure 1, the spur wheels 2 and 2' drive, by means of the spur wheels 3 and 3', bevel pinions 4 and 4' and the crown wheels 5 and 5', the half axle shafts 6 and 6' mounted in the half axles 9 and 9'.

Eyes or lugs 19 and 20 are provided on the casings 8 and 8' which enclose the axle drives and form the ends of the half axles. These eyes or lugs are mounted on the casing 21 which encloses the toothed wheel 17, the differential gear 18 and the intermediate longitudinal shafts 1 and 1'. For this purpose provision is made at the casing 21 for bearing pieces 22 enclosing the shafts 1 and 1'.

A brake drum 23 can be provided at the end of the main driving shaft 14. The short intermediate longitudinal shafts 1 and 1' may be used, contrary to the construction shown by way of example in the drawings, for joining up the casings of the half axles, which for their part must be firmly mounted on the chassis frame or central tube. Here, too, as in the case of the construction shown in Figure 1, the connecting gear wheels 2 and 3 may be housed in the half axle casing concerned.

The design here indicated maintains the advantage obtained by the construction shown in Figure 1, namely, that the devices for driving the various wheels are identical, thus facilitating manufacture, interchanges and repairs. The arrangement is particularly suitable for vehicles having a central chassis member as well as for vehicles having a number of pairs of wheels.

I claim:—

1. In driving mechanism for the wheels of divided swinging axles of motor vehicles, a longitudinally disposed rotating shaft, a pair of half-axle housings each including a gear case independently pivoted on said longitudinally disposed shaft, wheeled half-axles journalled in the respective half-axle housings, bevel gears on the adjacent ends of said half-axles, a stub shaft journalled in a bearing in each half-axle housing and having a bevel pinion to mesh with the respective bevel gear and each stub shaft also having a spur gear, and separate spur gears on said longitudinally disposed shaft which mesh with the respective spur gears on said stub shafts, one of said stub shafts and its gears being located forward of said half-axles and the other stub shaft and its gears being located aft of the same.

2. In driving mechanism for the wheels of divided swinging axles of motor vehicles, a longitudinally disposed rotating shaft, a pair of half-axle housings each including a gear case independently pivoted on said longitudinally disposed shaft, wheeled half-axles journalled in the respective half-axle housings, bevel gears on the adjacent ends of said half-axles, a stub shaft journalled in a bearing in each half-axle housing and having a bevel pinion to mesh with the respective bevel gear and each stub shaft also having a spur gear, and separate spur gears on said longitudinally disposed shaft which mesh with the respective spur gears on said stub shafts, one of said stub shafts and its gears being located forward of said half-axles and the other stub shaft and its gears being located aft of the same, said longitudinally disposed shaft comprising the main driving shaft of the vehicle.

3. In driving mechanism for the wheels of divided swinging axles of motor vehicles, a longitudinally disposed rotating shaft, a pair of half-axle housings each including a gear case independently pivoted on said longitudinally disposed shaft, wheeled half-axles journalled in the respective half-axle housings, bevel gears on the adjacent ends of said half-axles, a stub shaft journalled in a bearing in each half-axle housing and having a bevel pinion to mesh with the respective bevel gear and each stub shaft also having a spur gear, and separate spur gears on said longitudinally disposed shaft which mesh with the respective spur gears on said stub shafts, one of said stub shafts and its gears being located forward of said half-axles and the other stub shaft and its gears being located aft of the same, said longitudinally disposed shaft comprising a shaft connected by gearing with the main driving shaft of the vehicle.

HANS LEDWINKA.